TIMING SIGNAL SYNCHRONIZING CIRCUIT

Filed Nov. 14, 1960 2 Sheets-Sheet 1

INVENTORS:
Richard K. Gerlach
Tirey C. Abbott, Jr.
By Louis A. Kline
John J. Matlago
Their Attorneys.

Sept. 21, 1965 R. K. GERLACH ETAL 3,207,911

TIMING SIGNAL SYNCHRONIZING CIRCUIT

Filed Nov. 14, 1960 2 Sheets-Sheet 2

INVENTORS:
Richard K. Gerlach
Tirey C. Abbott, Jr.
By Louis A. Kline
John J. Matlago
Their Attorneys.

United States Patent Office 3,207,911

Patented Sept. 21, 1965

3,207,911

TIMING SIGNAL SYNCHRONIZING CIRCUIT

Richard K. Gerlach, Gardena, and Tirey C. Abbott, Jr., Manhattan Beach, Calif., assignors to The National Cash Register Company, Dayton, Ohio, a corporation of Maryland Filed Nov. 14, 1960, Ser. No. 69,050

7 Claims. (Cl. 307—88)

The present invention relates to signal synchronizing circuits and more particularly to an electronic circuit arrangement for automatically rephasing timing or clock signals for electronic digital systems.

In electronic digital systems it is known to provide timing signals synchronized with the rest of the equipment to enable the circuits included in the system to operate in proper time relationship. One manner of accomplishing the synchronizing is to provide a source of timing signals by reading a recording previously provided on a storage medium. As the storage medium is scanned for reading or recording informational data thereon, the timing signal recording is simultaneously read to provide timing signals which are used to identify the data and to properly operate the circuits. However, in certain scanning applications, as in the reading of business documents, for example, it is not desirable to provide a timing signal recording on the storage medium and, instead, only the data to be operated upon is stored, together with a reference signal which may or may not be a part of the useful data. The timing signals to be used in conjunction with the storage medium are in such applications generated independently of the scanning or sensing of the data from the storage unit. Thus when using this latter approach it is necessary to reset the timing signals so that they will be in phase with the data or reference signal sensed from the storage medium, in order to properly operate the electronic circuits associated with the storage unit.

Briefly, the present invention provides a clock or timing signal setting circuit which automatically delays clock signals by any desired amount. The timing signal setting circuit has a particular time period of delay set therein in response to a reference or initiating signal received from a storage medium, for example. Since the reference signal may be received during any instant of the period of a timing signal, the timing signal setting circuit must be able to be set to delay these signals regardless of the potential level of the timing signal at the time of receipt of the reference signal. The invention accordingly provides two delay circuits. One of the delay circuits operates to delay the timing signals when the reference signal occurs during one portion of a timing signal, while the other delay circuit operates to delay the timing signals when the reference signal occurs during the other portion of a timing signal. The timing signal setting circuit operates after each such setting to delay all the following timing signals by a similar fixed period of time, until the circuit has been cleared. The clock setting circuit can then be set to operate with a different time period of delay dependent on the instant of receipt of the next reference signal.

It is, therefore, an object of the invention to synchronize the occurrence of timing signals with a signal sensed from an independently timed source.

Another object of the invention is to provide an improved electronic circuit arrangement for automatically delaying timing signals such that the proper phase relationship is established and maintained between the timing signals and an incoming initiating signal.

It is a further object of this invention to provide a clock signal setting circuit which is capable of responding to synchronize timing signals with a reference signal irrespective of the instant during the period of a timing signal that a reference signal occurs.

It is still another object of this invention to provide a clock signal setting circuit which employs adjustable delay circuits comprised of multi-apertured cores.

Further objects and features of the invention will be readily apparent to those skilled in the art from the specification and appended drawings which illustrate a preferred embodiment of the invention.

Figure 1:
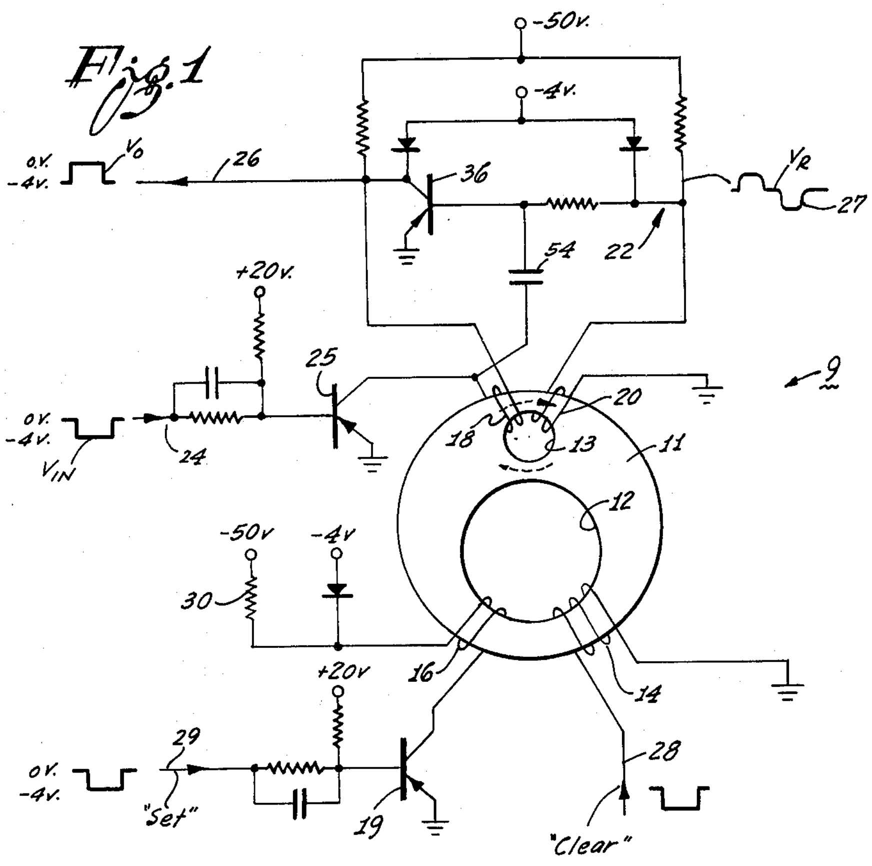
FIG. 1 is a circuit diagram of an adjustable delay circuit used in the present invention.
Figure 2:
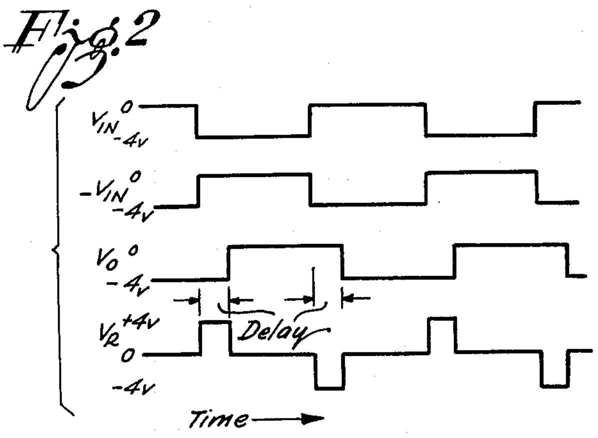
FIG. 2 illustrates signal waveforms for explaining the operation of the delay circuit shown in FIG. 1.
Figure 3:
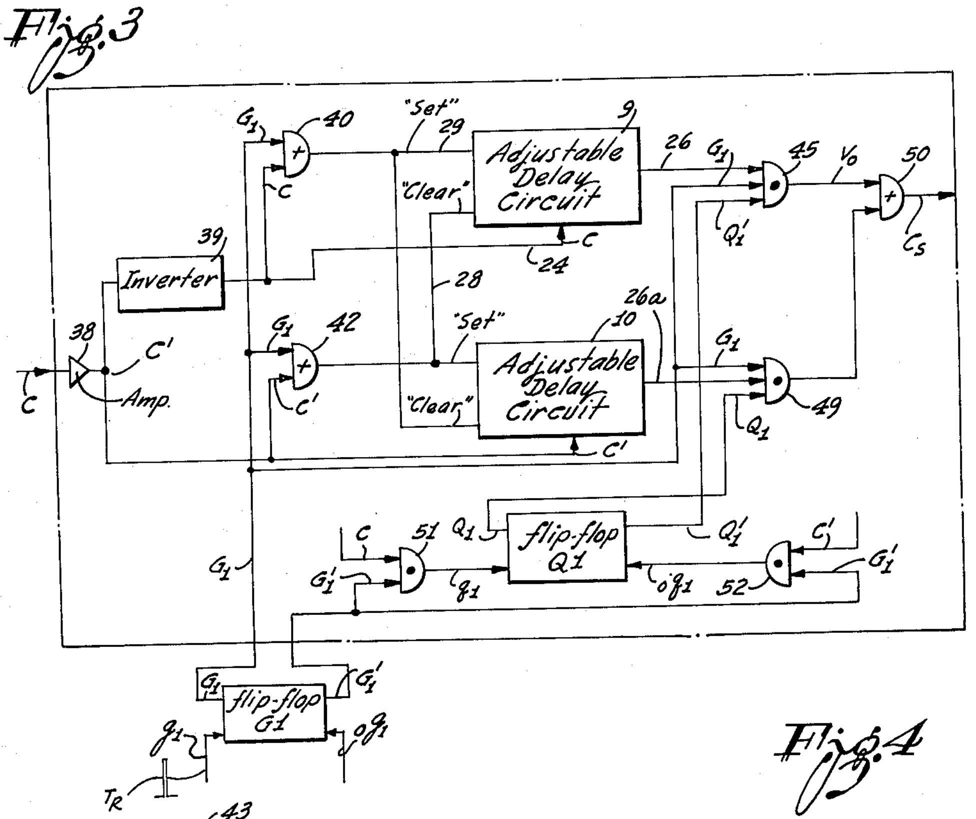
FIG. 3 is a block diagram of the timing signal setting circuit of the present invention.

Before describing the detail arrangement of the clock setting circuit shown in FIG. 3, the details of an individual adjustable delay circuit, such as the delay circuit 9 shown in block form in FIG. 3, will be presented. As shown in FIG. 1, this delay circuit 9 includes a multi-apertured core 11 having a high residual magnetism and a substantially rectangular hysteresis characteristic. The core 11 is provided with a major aperture 12 and a minor aperture 13. Wound about the outer leg of the major aperture 12 is a "clear" signal winding 14 and a "set" signal winding 16; and wound about the outer leg of minor aperture 13 is an input signal winding 18 and a "reset" signal winding 20. Connected to "set" signal winding 16 is a gating transistor 19 which in response to a signal applied on "set" input 29 completes a circuit from ground through winding 16 and through limiting resistor 30 to a —50 v. source. The output of winding 16 is clamped at —4 v., as shown. Connected to include "re-set" signal winding 20 is a "reset" circuit 22 which is also connected between ground and the —50 v. source. The output of winding 20 is also clamped at —4 v. Connected to one end of input winding 18 is a gating transistor 25 which in response to a signal applied on input 24 provides a path from ground through winding 18 to the —50 v. source. Connected to the other end of winding 18, which is also clamped at —4 v., is a signal output lead 26. In the operation of the delay circuit 9, a signal applied to the "clear" input 28 of winding 14 initially saturates the core in one direction, as for example in a clockwise direction about major aperture 12. A predetermined volt-microsecond signal then applied on the "set" signal input 29 connected to the base of transistor 19, causes the latter to conduct through winding 16 to partially reverse the flux in a counter-clockwise direction about the major aperture 12. This results in storing in the path about the minor aperture 13 a predetermined amount of flux, as illustrated by the arrows about minor aperture 13 in FIG. 1. The amount of flux stored in this manner about aperture 13 determines the delay of the circuit. It should be noted that during the period the delay circuit is inactive, the signal $V_o$ on output lead 26 is of a low operating potential level (—4 v.) and the signal $V_{in}$ on the input 24 connected to the base of transistor 25 is at a high operating potential level (0 v.) When the signal $V_{in}$, applied on the signal input 24 swings to the low potential level, —4 v., the current supplied through transistor 25 to the input signal winding 18 reverses magnetic flux previously stored around the minor aperture 13, and during the reversal, because of the high impedance accompanying this reversal of flux, only a negligible current passes through winding 18 to the —50 v. source. The output 26 is thus held at the clamping voltage of −4 v. When the reversal is completed, however, the sudden drop in impedance in winding 18 causes a sharp increase in current passing from ground to the −50 v. source, thus forming on output 26 the positive going edge of the signal $V_o$ to the high operating potential level of 0 v. The effect of this operation is that the negative-going leading edge of the signal $V_{in}$ on input 24 is delayed in appearing on output 26 as the positive-going leading edge of the signal $V_o$ for a time interval which is dependent upon the amount of the magnetic flux reversal in the path around the minor aperture 13. Thus, it is only when all the flux about minor aperture 13 has been reversed that the signal $V_o$ on the output 26 abruptly swings to the high potential level of 0 v. This signal on the output 26 is then held at the high potential level of 0 v. by the conduction through transistor 25 caused by the low potential level −4 v. of signal $V_{in}$ on the input 24.

The reset circuit 22 which includes the "reset" winding 20 is effective to generate the negative portion 27 of signal $V_R$, after the signal on input 24 swings to the high potential level, to cause magnetic flux of the same magnitude as the "set" signal to be reset in the path about the minor aperture 13. The time required to reset the stored flux is equal to the delay of the circuit. The reset circuit 24 is also connected to maintain conduction through transistor 36 while the negative portion 27 of the "reset" signal $V_R$ is present. In this way, the trailing edge of the signal $V_o$ on the output 26 is delayed for the same time interval as the leading edge was delayed. More particularly, transistor 36 has its collector coupled to the output 26 of the signal delay circuit, its emitter coupled to ground, and its base connected to reset circuit 22. This arrangement provides for connecting the output circuit 26 to ground through an alternate path during the time period that the magnetic flux is being reset or reversed about aperture 13 of core 11. Thus, in response to the negative portion 27 of the resetting signal, the output circuit 26 is coupled to ground through this alternate path including the transistor 36.

There may be a very brief time interval between the trailing edge of the input signal and the leading edge of the negative portion 27 of the resetting signal $V_R$. In order to maintain a connection to ground via transistor 36 during this brief interval, the base of the transistor 36 is coupled by capacitor 54 to a lead connecting the collector of the transistor 25 to the signal delay winding 18. The capacitor 54 has such a response time that is develops a negative charge that is coupled to the base of the transistor 36 whereby the transistor is made conductive to couple the output circuit 26 of the delay circuit to ground. As a result of this coupling, the output signal $V_o$ will not follow the trailing edge of the input signal $V_{in}$ during the brief interval between the trailing edge of the input signal and the leading edge of the negative portion 27 of the resetting signal $V_R$. The transistor 36 remains conductive by the charge on capacitor 54 until the negative portion 27 of the resetting signal takes over to maintain conduction through transistor 36, and therefore maintain connection of the output circuit to ground through the alternate path.

In a similar manner, all subsequent signals $V_{in}$ coupled to the input 24 of the delay circuit are delayed for the time interval determined by the "set" signal, until a "clear" signal is applied to the "clear" input 28 of the circuit. For a more detailed description of the adjustable delay circuit of the type described, reference is made to a co-pending U.S. application of Richard K. Gerlach et al., Serial No. 828,910, filed July 22, 1959, now Patent No. 3,156,903. The timing or clock signal setting circuit of FIG. 3 operates to synchronize the timing of the clock signals C with respect to the timing of a signal, such as signal $T_R$, provided from a separate source. This clock setting circuit operates at the occurrence of a $T_R$ signal to delay each of the successive clock signals C by a delay time interval determined by the phase difference between the negative-going edge of a C or C′ signal and the leading edge of a $T_R$ signal.

Figure 4:
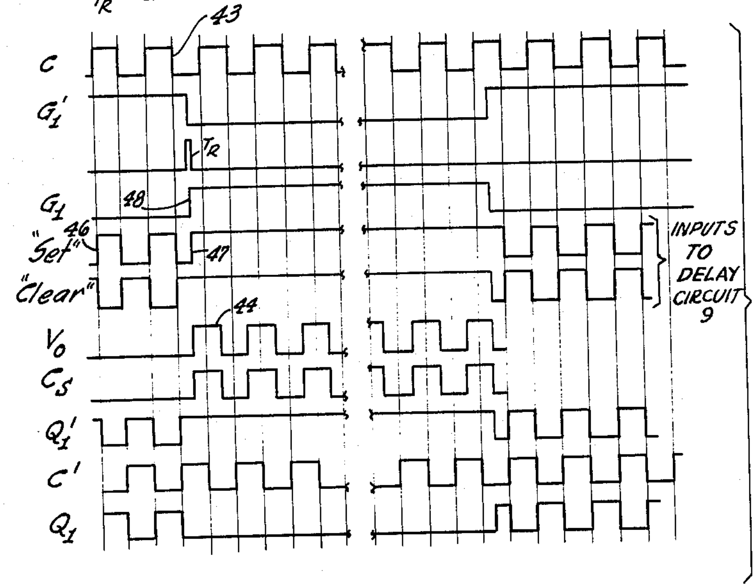
FIG. 4 illustrates certain typical signal waveforms for explaining the operation of the circuit shown in FIG. 3.

As shown in FIG. 4, clock pulse C is preferably shaped as a square wave, i.e., to periodically swing between a relatively high operating potential level and relatively low operating potential level. As shown in FIG. 3, this signal is amplified in amplifier 38 and inverted in inverter 39 to form on separate leads the respective signals C and C′, which signals are complements of each other, i.e., when signal C is at the high potential level, signal C′ is at the low potential level, and vice versa.

In accordance with the embodiment shown, a reference signal $T_R$, produced by an independently timed source, operates to trigger flip-flop G1 into a true state. During the time period the flip-flop G1 is in the true state, its output $G_1$ is at the high potential level and its output $G_1'$ is at the low potential level. The outputs from the G1 flip-flop are directed into the clock signal setting circuit of FIG. 3 to set into this circuit a desired amount of delay, and thus initiate its operation. Thus, the outputs from the G1 flip-flop which are synchronized with the reference signal $T_R$ may be considered as providing the initiating signals for the signal setting circuit of FIG. 3.

As shown in FIG. 3, the $G_1$ and C signals are effectively compared by feeding them through an "or" gate 40 whose output is connected to the "set" input 29 for the first adjustable delay circuit 9. As will be more clearly understood infra, this output from the "or" gate 40 also provides the "clear" input signal for second adjustable delay circuit 10. In a similar manner, the $G_1$ and C′ signals are effectively compared by feeding them through an "or" gate 42 whose output is connected to the "clear" input 28 for the first delay circuit 9 and the "set" input for the second delay circuit 10.

Referring to the first delay circuit 9, when the flip-flop G1 is in its false state, prior to receipt of the $T_R$ signal on its true trigger input $g_1$, the full waveform of clock signals C are applied through "or" gate 40 to the "set" input of the first delay circuit 9, and the full waveform of clock signals C′ are applied through "or" gate 42 to the "clear" input of this first delay circuit 9. The waveforms for the "clock," "set" and "clear" signals as applied to the first delay circuit 9 are shown in FIG. 4. For such operation, each low potential level portion of clock signal C, as evidenced at the output of "or" gate 40, sets a delay into the delay circuit 9, and the following low potential level portion of clock signal C′, as evidenced at the output of "or" gate 42, clears this delay from the circuit in preparation for setting by a subsequent "set" signal. It should be noted that the low potential level portion of clock signal C is applied on input 24 of delay circuit 9 simultaneously with the application of this same portion of signal C to the "set" input 29 of delay circuit 9. The "set" signal serves to hold the signal output 26 at the low potential level, thus effectively preventing any signals from being passed to the output of the delay circuit. In a similar manner, each low potential level portion of clock signal C′, as evidenced at the output of "or" gate 42, sets a delay into the delay circuit 10, and the following low potential level portion of clock signal C, as evidenced at the output of "or" gate 40, clears this delay from the circuit in preparation for setting by a subsequent "set" signal. The important operation to note here is that prior to flip-flop G1 being in a true state the circuit is cleared each period of clock signal C. For this condition, the output from the delay circuit of FIG. 3 is of no concern since the false state of the G1 flip-flop prevents any signals on the output 26 of delay circuit 9, or the output 26a of delay circuit 10 from passing through the "and" gates 45 or 49, respectively.

At the instant a reference signal $T_R$ is received, flip-flop G1 is triggered true, as previously described. As shown in FIG. 4, if output $G_1$ happens to swing to the high operating potential level at the instant the clock signal C is at its low potential level, the "set" signal 46, fed into the first delay circuit 9 is shortened, as shown by signal 47 in FIG. 4, depending on the occurrence of the positive-going edge 48 of the $G_1$ signal within the period that the C signal is at its low potential level. As a consequence of the shortened "set" signal 47, the period of delay set into the delay circuit is likewise shortened.

The "clear" signal input to the delay circuit 9 is now cut-off since output $G_1$ is high in potential level and maintains the output of the "or" gate 42 at the high potential level. It should be noted that the portion of the input signal waveform C, designated 43 in FIG. 4, is applied onto the input 24 of the delay circuit 9 simultaneously with the application of the "set" signal 47. The "set" signal serves to hold the signal output 26 at the low potential level, such that the formation of the first signal 44 of output $V_o$ immediately follows the "set" signal 47, in time, as shown in FIG. 4. The first delay circuit 9 now resides in a condition in which it is set to provide a fixed interval of delay for all subsequent clock signals C provided at its signal input 24.

Since signal C′ was at its high potential level, at the time flip-flop G1 was triggered true, a flip-flop Q1 responding to these signals is left in the false state having a high level signal on output $Q_1'$, as shown by the waveform $Q_1'$ in FIG. 4. This condition assures that the output of delay circuit 9 passes through "and" gate 45 to provide signals $C_S$. As shown by the waveforms in FIG. 4, this operation prevails for a number of clock periods until flip-flop G1 is triggered false by application of a signal to its false trigger input $_0g_1$.

It should be obvious that the positive-going leading edge 48 of the signal $G_1$, as shown in FIG. 4, may occur during either the relatively low or relatively high potential level portion of the cycle of the clock signal C, and it is desired to set the clock setting circuit during either portion of its cycle. Thus, to provide a properly initiated delayed series of clock signals during the high potential level portion of the clock signal C, the second adjustable delay circuit 10 is provided in which clock signal C′ coupled to its signal input are the complements of the clock signal C. It should be noted, that clock signal C′ is at the low level potential when clock signal C is at the high level potential, and vice versa. As previously discussed, the "set" signal for the second delay circuit 10 is derived from the "or" gate 42, and the "clear" signal for the circuit 10 is derived from the "or" gate 40. If the $T_R$ signal triggers the G1 flip-flop into a true state during a period that clock signal C′ is low in potential level, then a "set" signal passes through the "or" gate 42 to set a delay into second delay circuit 10 such that this delay circuit now can, in response to clock signals C′, provide the properly delayed $C_s$ clock signals.

The adjustable delay circuits are designed to respond to low potential level input signals. Thus, during any particular initiation of the clock setting circuit in FIG. 3, either one or the other of the adjustable delay circuits 9 or 10 is active to provide the desired delayed clock signal $C_s$. The delay circuit activated is the delay circuit which happens to receive the low potential level clock signal C or C′ at the instant the flip-flop G1 is triggered into its true state. Thus, at the instant signal $G_1$ is switched to a high potential level, a low potential level "set" signal, whose duration is proportional to the desired delay, is produced either on the output of the "or" gate 40 by the combination of the $G_1$ signal with the clock signal C, or on the output of the "or" gate 42 by the combination of the $G_1$ signal with clock signal C′.

Flip-flop Q1 has been provided to gate out the output of whichever one of the adjustable delay circuits 9 or 10 is active in delaying timing signals at a given time. During the period that no clock signal output $C_S$ is provided by the setting circuits, i.e., during the period signal output $G_1'$ is high in potential, the false output $Q_1'$ of flip-flop Q1 follows the clock signals C′, as shown by the respective waveforms in FIG. 4. To trigger the flip-flop Q1, "and" gates 51 and 52, individual to the trigger inputs $Q_1$ and $_0Q_1$, pass clock signals C and C′, respectively. Upon the occurrence of a signal $T_R$, for example, which triggers the flip-flop G1 to its true state, the gates 51 and 52 no longer pass clock pulses C and C′ and the flip-flop Q1 remains in the state it last resided in.

The signal outputs of the adjustable delay circuits 9 and 10 are passed through the "and" gate 45 or the "and" gate 49, and then through an "or" gate 50 to the output $C_S$ of the clock setting circuit. During the periods adjustable delay circuit 9 is operative to produce the desired delay, the signal outputs $Q_1'$ and $G_1$ open "and" gate 45 to pass the signal output of the adjustable delay circuit 9 through the "or" gate 50. During the periods that the adjustable delay circuit 10 is operative to produce the desired delay, the signal outputs $Q_1$ and $G_1$ open the "and" gate 49 to pass the signal output of adjustable delay circuit 10 through "or" gate 50. Thus, the output from one of the delay circuits, as selected by the Q1 flip-flop, provides the series of clock signals $C_S$ which have been phased with the reference signal $T_R$.

While the form of the invention shown and described herein is admirably adapted to fulfill the objects primarily stated, it is to be understood that it is not intended to confine the invention to the one form or embodiment disclosed herein, for it is susceptible of embodiment in various other forms.

What is claimed is:

1. A timing signal delay circuit comprising: a source of periodic timing signals; an inverter for providing an inverted form of the timing signals; means for providing a reference signal; means for comparing the reference signal with said timing signals and said inverted timing signals; a first delay circuit responsive to the output of said comparing means and said source to provide delayed timing signals when said reference signal occurs during a predetermined portion of the period of a timing signal; and a second delay circuit responsive to the output of said comparing means and said inverter to provide delayed timing signals when said reference signal occurs during a predetermined portion of the period of an inverted timing signal.

2. A timing signal delay circuit comprising: a source of periodic timing signals, each timing signal period defined by a low potential level followed by a high potential level; an inverter for forming the complements of said timing signals, each complemented timing signal period defined by a high potential level followed by a low potential level; means for providing a reference signal; means for comparing the time of occurrence of said reference signal with said timing signals and said complemented timing signals; a first delay circuit connected to said source and said comparing means to provide delayed timing signals when said reference signal occurs during a low potential level of a timing signal; and a second delay circuit connected to said source and said comparing means to provide delayed timing signals when said reference signal occurs during a low potential level of a complemented timing signal.

3. A timing signal delay circuit comprising: a source of periodic timing signals, each cycle of a timing signal being evidenced by a waveform having a first level potential followed by a second level potential; an inverter for inverting said timing signals, each cycle of an inverted timing signal being evidenced by a waveform having said second level potential followed by said first level potential; means for providing an initiating signal; a first delay circuit means responsive to said initiating signal and said timing signals and effective to provide delayed timing signals when said initiating signal occurs during the first level potential of a timing signal; and a second delay circuit means responsive to said initiating signal and said inverted timing signals and effective to provide delayed timing signals when said initiating signal occurs during the first level potential of an inverted timing signal.

4. A timing signal delay circuit comprising: a source of periodic timing signals, each cycle of a timing signal defined by a low potential level portion followed by a high potential level portion; an inverter for forming the complements of said timing signals, each cycle of a complemented timing signal defined by a high potential level portion followed by a low potential level portion; means for providing a reference signal; a first gating means capable of providing an output signal when said reference signal occurs during the low potential level portion of a timing signal; a second gating means capable of providing an output signal when said reference signal occurs during the low potential level portion of an inverted timing signal; a first multi-apertured core; a second multi-apertured core; means responsive to the output signal of said first gating means and capable of storing flux about an aperture of said first multi-apertured core; means responsive to the output signal of said second gating means and capable of storing flux about an aperture of said second multi-apertured core; and circuit means responsive to said timing signals and inductively coupled to said first and second multi-apertured cores, said circuit means being capable of delaying said timing signals in accordance with the amount of flux stored about the aperture of either of said cores.

5. A timing signal delay circuit comprising: a source of periodic square wave timing signals; an inverter for providing an inverted waveform of the timing signals; means for providing a reference signal; a first gating means for providing an output signal corresponding to a phase relationship of said reference signal with a timing signal; a second gating means for providing an output signal corresponding to a phase relationship of said reference signal with an inverted timing signal; a first delay circuit to which said timing signals are applied, said first delay circuit capable of being set to provide a delay time for said timing signals in response to the output signal of said first gating means; a second delay circuit to which said inverted timing signals are applied, said second delay circuit capable of being set to provide a delay time for said inverted timing signals in response to the output signal of said second gating means; an output line; and means for providing delayed timing signals on said output line from either said first or second delay circuit dependent upon whether on occurrence of said reference signal said first or second gating means provides an output signal.

6. A timing signal delay circuit comprising: a source of periodic timing signals, each timing signal cycle defined by a low potential level followed by a high potential level; an inverter for forming the complements of said timing signals, each complemented timing signal cycle defined by a high potential level followed by a low potential level; means for providing a reference signal; means for comparing the time of occurrence of said reference signal with said timing signals and said complemented timing signals; a first delay circuit connected to said source and said comparing means to provide delayed timing signals when said reference signal occurs during a predetermined potential level of a timing signal; and a second delay circuit connected to said source and said comparing means to provide delayed timing signals when said reference signal occurs during said predetermined potential level of a complemented timing signal.

7. A signal synchronizing circuit comprising: a source of periodic square wave clock pulses; a source of a trigger signal; a first and a second variable delay circuit to which the clock pulses are applied; an output line; means for selecting said first or second delay circuit to provide clock pulses on said output line, the selection being determined in accordance with whether the trigger signal coincides with the presence or absence of a clock pulse; and means responding to the trigger signal and the clock pulses for setting a delay in the selected delay circuit, the arrangement being such that the clock pulses provided on said output line are delayed by the time interval between the trigger signal and a fixed point in the clock pulse cycle.

References Cited by the Examiner

UNITED STATES PATENTS

| | | | |
|---|---|---|---|
| 2,830,179 | 4/58 | Stenning | 328—63 |
| 2,988,653 | 6/61 | Samusenko | 340—174 |
| 3,031,646 | 4/62 | Reinholtz | 340—146.2 X |
| 3,102,995 | 9/63 | Abbott et al. | 340—146.3 |
| 3,117,308 | 1/64 | Sublette | 307—88 |
| 3,123,718 | 3/64 | Knox-Seith | 340—174 X |

IRVING L. SRAGOW, *Primary Examiner.*

STEPHEN W. CAPELLI, *Examiner.*